(12) United States Patent
Yang et al.

(10) Patent No.: US 11,265,898 B2
(45) Date of Patent: Mar. 1, 2022

(54) SCHEDULING METHOD, DEVICE AND SYSTEM FOR TRANSMITTING RESOURCES

(71) Applicant: GUANGDONG OPPO MOBILE TELECOMMUNICATIONS CORP., LTD., Guangdong (CN)

(72) Inventors: Ning Yang, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 79 days.

(21) Appl. No.: 16/714,233

(22) Filed: Dec. 13, 2019

(65) Prior Publication Data

US 2020/0120698 A1   Apr. 16, 2020

Related U.S. Application Data

(63) Continuation of application No. PCT/CN2017/098900, filed on Aug. 24, 2017.

(51) Int. Cl.
*H04W 72/04* (2009.01)
*H04W 72/12* (2009.01)
(Continued)

(52) U.S. Cl.
CPC ....... *H04W 72/1268* (2013.01); *H04L 5/0053* (2013.01); *H04W 72/042* (2013.01);
(Continued)

(58) Field of Classification Search
None
See application file for complete search history.

(56) References Cited

U.S. PATENT DOCUMENTS 9,743,427 B2 *   8/2017   Fujishiro ............... H04L 5/0062
2012/0243516 A1   9/2012   Ishii
(Continued)

FOREIGN PATENT DOCUMENTS

CN   101965059 A   2/2011
CN   102307393 A   1/2012
(Continued)

OTHER PUBLICATIONS

Samsung, "RRC signalling to support LTE+NR Co-existence", 3GPP TSG-RAN WG2 99 meeting R2-1709504, Berlin, Germany, Aug. 21-25, 2017(Re-submission of R2-1706885).
(Continued)

*Primary Examiner* — Sai Aung

(57) ABSTRACT

A scheduling method, a device and a system for transmitting resources are provided. The method comprises: receiving candidate uplink data sending resources sent by a first base station, or receiving candidate downlink data receiving resources sent by the first base station; determining, from the candidate uplink data sending resources, and according to downlink transmission resources for a second base station, a transmission resource for sending uplink data to the first base station, or determining, from the candidate downlink data receiving resources, and according to uplink transmission resources for the second base station, a transmission resource for receiving downlink data from the first base station.

20 Claims, 6 Drawing Sheets

System 160 for scheduling transmission resources

(51) Int. Cl.
*H04L 5/00* (2006.01)
*H04W 72/08* (2009.01)

(52) U.S. Cl.
CPC ... *H04W 72/0413* (2013.01); *H04W 72/0446* (2013.01); *H04W 72/0453* (2013.01); *H04W 72/082* (2013.01); *H04W 72/085* (2013.01); *H04W 72/1205* (2013.01); *H04W 72/1289* (2013.01)

(56) References Cited

U.S. PATENT DOCUMENTS

| | | | | |
|---|---|---|---|---|
| 2014/0254541 | A1* | 9/2014 | Morita | H04W 16/10 370/329 |
| 2014/0357285 | A1* | 12/2014 | Smith | H04W 16/14 455/450 |
| 2015/0181470 | A1* | 6/2015 | Chai | H04W 36/08 455/438 |
| 2016/0014781 | A1 | 1/2016 | Nagata et al. | |
| 2016/0197781 | A1* | 7/2016 | Smith | H04L 41/0806 370/254 |
| 2018/0077624 | A1* | 3/2018 | Jung | H04W 52/0225 |

FOREIGN PATENT DOCUMENTS

| | | | |
|---|---|---|---|
| CN | 102594537 | A | 7/2012 |
| CN | 106686728 | A | 5/2017 |

OTHER PUBLICATIONS

Written Opinion of the International Search Authority in the international application No. PCT/CN2017/098900, dated Apr. 27, 2018.
QUALCOMM Incorporated: "NR LTE Coexistence", 3GPP Draft; R1-1700841 NR LTE Coexistence, 3rd Generation Partnership Project (3GPP), Mobile Competence Centre ; 650, Route Des Lucioles; F-06921 Sophia-Antipolis Cedex France, vol. RAN WG1, No. Spokane, U.S.A.; Jan. 16, 2017-Jan. 20, 2017 Jan. 16, 2017 (Jan. 16, 2017), XP051208360, Retrieved from the Internet: URL: http://www.3gpp.org/ftp/Meetings_3GPP_SYNC/RAN1/Docs/ [ retrieved on Jan. 16, 2017] paragraph [03.1]. figure 1.
Supplementary European Search Report in the European application No. 17922204.7, dated Jun. 22, 2020.
International Search Report in the international application No. PCT/CN2017/098900, dated Apr. 27, 2018.
Written Opinion PCT/CN2017/098900, dated Apr. 27, 2018.
GUALCOMM Incorporated. NR LTE Adjacent Channel Coexistence Consideration. 3GPP TSG-RAN WG1 RAN1 NR BIS, R1-1705642., Apr. 7, 2017 (Apr. 7, 2017), parts 3 and 3.1.
Office Action of the Indian application No. 201917053974, dated Mar. 26, 2021.
First Office Action of the Chilean application No. 201903659, dated Mar. 17, 2021.
First Office Action of the European application No. 17922204.7, dated Nov. 24, 2021.
Second Office Action of the Chilean application No. 201903659, dated Nov. 26, 2021.

* cited by examiner

SCHEDULING METHOD, DEVICE AND SYSTEM FOR TRANSMITTING RESOURCES

CROSS-REFERENCES TO RELATED APPLICATION

This application is a continuation application of International Application No. PCT/CN2017/098900 filed on Aug. 24, 2017, the content of which is hereby incorporated by reference in its entirety.

TECHNICAL FIELD

The disclosure relates to the wireless communication technology, and particularly to a method, a device and a system for scheduling transmission resources.

BACKGROUND

With development of communication technologies, researches on 5$^{th}$ Generation (5G) mobile communication technology have been made. Radio access of 5G is called new radio (NR). At present, a spectrum resource adopted in each of three major application scenarios defined for 5G which include enhanced mobile broadband (eMBB), massive machine type communications (mMTC) and ultra-reliable low latency communications (URLLC), includes a frequency band below 6 GHz, while a frequency resource adopted for long term evolution (LTE) communication of a terminal in a LTE system is nearby 2 GHz. Therefore, when a terminal simultaneously performs LTE and NR communication, it is relatively likely to generate interference between two frequency bands. The interference may include cross modulation interference, harmonic interference and harmonic mixing interference. Due to the interference, the terminal cannot simultaneously perform LTE and NR communication for data transmission and reception. That is, data transmission of the terminal through the LTE may interfere with data reception of the terminal through the NR, and data transmission of the terminal through the NR may interfere with data reception of the terminal through the LTE.

For solving the problem, a solution adopted currently includes scheduling an uplink transmission resource and downlink transmission resource of a terminal by a base station, thereby avoiding the terminal from simultaneously performing uplink transmission and downlink transmission of data on resources between which interference occurs. However, the solution may results in an increase in a processing load of the base station.

DETAILED DESCRIPTION

Figure 1:
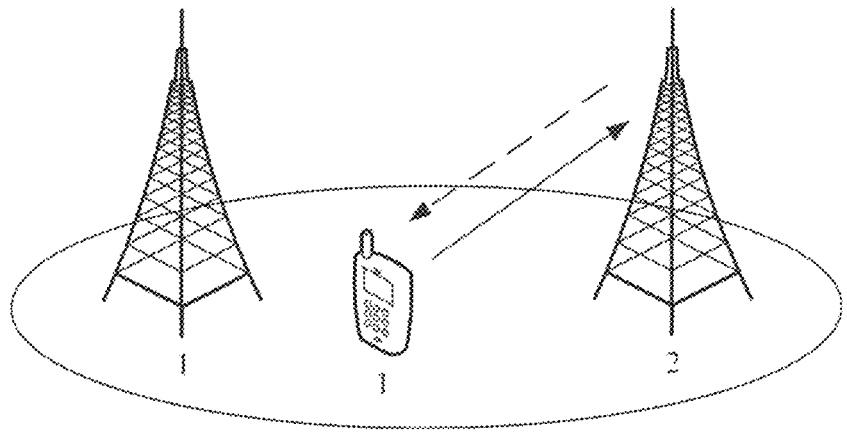
FIG. 1 is a schematic diagram of an application scenario according to an embodiment of the disclosure.

During smooth transition from LTE to 5G, a phase that LTE and 5G coexist occurs and a phenomenon in which two radio access manners and two core networks coexist occurs at this phase. The two radio access manners include an LTE access manner and a NG access manner, and the two core networks include an evolved packet core (EPC) and a next generation core network (NGCN). Base stations corresponding to the above two access manners may include an evolved node B (eNB) and a gNB. Therefore, a base station at a network side involved in the embodiments of the disclosure may include the two base stations. It may be understood that the base station may further include a base station of a type appearing in a subsequent technical development process, which is not limited in the embodiments of the disclosure.

The embodiments of the disclosure provide at least the following technical solutions.

According to a first aspect, a method for scheduling transmission resources is provided according to an embodiment of the disclosure, which is applied to a terminal and includes the following operations.

Candidate uplink data sending resources sent by a first base station are received, or candidate downlink data receiving resources sent by a first base station are received.

A transmission resource for sending uplink data to the first base station is determined from the candidate uplink data sending resources according to a downlink transmission resource for a second base station, or a transmission resource for receiving downlink data from the first base station is determined from the candidate downlink data receiving resources according to an uplink transmission resource for a second base station.

According to a second aspect, a method for scheduling transmission resources is provided according to an embodiment of the disclosure, which is applied to a first base station and may include the following operations.

Candidate uplink data sending resources are allocated based on a downlink transmission resource for a second base station, or candidate downlink data receiving resources are allocated based on an uplink transmission resource for a second base station.

The candidate uplink data sending resources or the candidate downlink data receiving resources are sent to a terminal. The candidate uplink data sending resources are used by a terminal to select a transmission resource for sending uplink data to the first base station, and the candidate downlink data receiving resources are used by the terminal to select a transmission resource for receiving downlink data from the first base station.

According to a third aspect, a terminal is provided according to an embodiment of the disclosure, which may include a first receiving portion and a selecting portion.

The first receiving portion is used to receive candidate uplink data sending resources sent by a first base station or receive candidate downlink data receiving resources sent by a first base station.

The selecting portion is used to determine a transmission resource for sending uplink data to the first base station from the candidate uplink data sending resources according to a downlink transmission resource for the second base station, or determine a transmission resource for receiving downlink data from the first base station from the candidate downlink data receiving resources according to an uplink transmission resource for the second base station.

According to a fourth aspect, a base station is provided according to an embodiment of the disclosure, which may include an allocating portion and a third sending portion.

The allocating portion may be used to allocate candidate uplink data sending resources based on a downlink transmission resource for a second base station or allocate candidate downlink data receiving resources based on an uplink transmission resource for a second base station.

The third sending portion may be used to send the candidate uplink data sending resources or the candidate downlink data receiving resources to a terminal. The candidate uplink data sending resources are used by a terminal to select a transmission resource for sending uplink data to the base station, and the candidate downlink data receiving resources are used by the terminal to select a transmission resource for receiving downlink data from the base station.

According to a fifth aspect, a terminal is provided according to an embodiment of the disclosure, which may include a first network interface, a first memory and a first processor.

The first network interface may be used to receive and send a signal in a process of receiving and sending information with another external network element.

The first memory may be used to store a computer program capable of being run in the first processor.

The first processor may be used to run the computer program to execute the operations of the method in the first aspect.

According to a sixth aspect, a base station is provided according to an embodiment of the disclosure, which may include a second network interface, a second memory and a second processor.

The second network interface may be used to receive and send a signal in a process of receiving and sending information with another external network element.

The second memory is used to store a computer program capable of being run in the second processor.

The second processor may be used to run the computer program to execute the operations of the method in the second aspect.

According to a seventh aspect, a computer-readable medium is provided according to an embodiment of the disclosure, which may store a program for scheduling transmission resources. The program for scheduling transmission resources is executed by at least one processor to implement the operations of the method in the first aspect.

According to an eighth aspect, a computer-readable medium is provided according to an embodiment of the disclosure, which may store a program for scheduling transmission resources. The program for scheduling transmission resources is executed by at least one processor to implement the operations of the method in the second aspect.

According to a ninth aspect, a system for scheduling transmission resources is provided according to an embodiment of the disclosure, which may include a terminal and a base station.

The base station may be used to allocate candidate uplink data sending resources based on a downlink transmission resource for a second base station or allocate candidate downlink data receiving resources based on an uplink transmission resource for a second base station, and send the candidate uplink data sending resources or the candidate downlink data receiving resources to the terminal. The candidate uplink data sending resources are used by a terminal to select a transmission resource for sending uplink data to the base station, and the candidate downlink data receiving resources are used by the terminal to select a transmission resource for receiving downlink data from the base station.

The terminal may be used to receive the candidate uplink data sending resources or receive the candidate downlink data receiving resources, and determine a transmission resource for sending uplink data to the base station from the candidate uplink data sending resources according to a downlink transmission resource for the second base station, or determine a transmission resource for receiving downlink data from the base station from the candidate downlink data receiving resources according to an uplink transmission resource for the second base station.

The method, the device and the system for scheduling transmission resources are provided according to the embodiments of the disclosure. The terminal selects from the candidate uplink data sending resources sent by the first base station based on the downlink transmission resource for the second base station, a transmission resource which is capable of avoiding from interfering with the downlink transmission resource and used to send the uplink data to the first base station, or the terminal selects from the candidate downlink data receiving resources sent by the first base station based on the uplink transmission resource for the second base station, a transmission resource which is capable of avoiding from interfering with the uplink transmission resource and used to receive the downlink data to the first base station. Therefore, scheduling of the base station is avoided, and further a processing load of the base station is reduced.

FIG. 1 is a schematic diagram of an atypical application scenario according to an embodiment of the disclosure. A terminal 1 is within coverage, as illustrated by an ellipse in FIG. 1, of a base station 1 and a base station 2. The base station 2 allocates an uplink transmission resource and a downlink transmission resource to the terminal 1, uplink transmission is illustrated as a solid arrow in FIG. 1 and downlink transmission is illustrated as a dotted arrow in FIG. 1. The terminal 1 communicates with the base station 1 based on the uplink transmission resource and the downlink transmission resource allocated by the base station 2. It may be understood that, in FIG. 1, the base station 1 and the base station 2 may be an eNB and a gNB, respectively, or may further be a network device appearing in the subsequent technical development process and used to implement radio access of a terminal, which is not limited in the embodiments of the disclosure.

The technical solutions of the embodiments of the disclosure will be described based on the application scenario illustrated in FIG. 1.

First Embodiment

Figure 2:
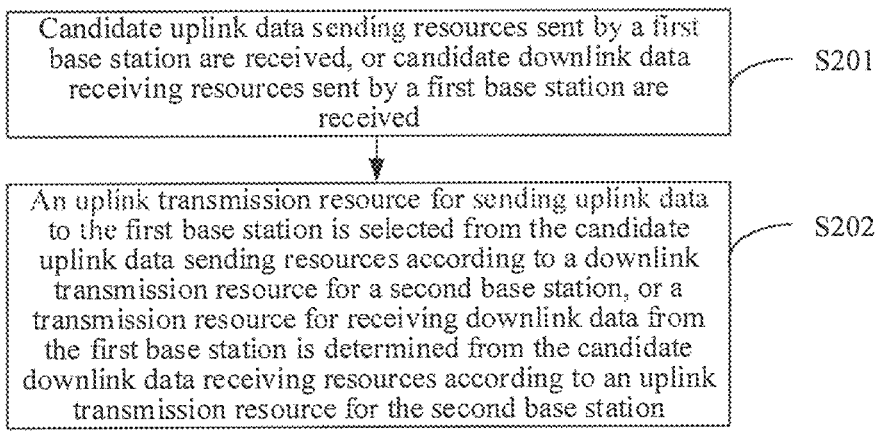
FIG. 2 is a flowchart of a method for scheduling transmission resources according to an embodiment of the disclosure.

Referring to FIG. 2, which illustrates a method for scheduling transmission resources provided in the embodiment of the disclosure, the method includes operations in S201 and S202.

In S201, candidate uplink data sending resources sent by a first base station are received, or candidate downlink data receiving resources sent by a first base station are received.

In S202, an uplink transmission resource for sending uplink data to the first base station is selected from the candidate uplink data sending resources according to a downlink transmission resource for a second base station, or, a transmission resource for receiving downlink data from the first base station is determined from the candidate downlink data receiving resources according to the uplink transmission resource for a second base station.

The technical solution illustrated in FIG. 2 may be applied to the terminal in the scenario illustrated in FIG. 1. In an implementation process, the terminal may include, for example, a user equipment (UE), a mobile station (MS), a mobile wireless device, a mobile communication device, a tablet computer, a handset or a wireless device of another type, which is not limited in the embodiment.

Since an uplink sending resource for the first base station interferes with a downlink receiving resource for the second base station, and the downlink receiving resource for the first base station interferes with the uplink sending resource for the second base station currently, in the technical solution illustrated in FIG. 2, the terminal selects from the candidate uplink data sending resources sent by the first base station based on the downlink transmission resource for the second base station, a transmission resource which is capable of avoiding from interfering with the downlink transmission resource and used to send the uplink data to the first base station, or the terminal selects from the candidate downlink data receiving resources sent by the first base station based on the uplink transmission resource for the second base station, a transmission resource which is capable of avoiding from interfering with the uplink transmission resource and used to receive the downlink data from the first base station. Therefore, scheduling of the base station is avoided, and further a processing load of the base station is reduced.

For the technical solution illustrated in FIG. 2, in a possible implementation, before the operation in S201, the method may further include the following operation.

A resource request indication is sent to the first base station. The resource request indication requests the first base station to allocate the candidate uplink data sending resources or the candidate downlink data receiving resources.

In the implementation, the resource request indication may be reported in the form of signaling, and a format of the reported signaling may be physical-layer signaling, media access control (MAC)-layer signaling or radio resource control (RRC)-side signaling. The format will not be elaborated herein. In addition, corresponding to sending of the resource request indication, a frequency identifier or a time identifier may further be sent. Based on the frequency identifier or the time identifier, an uplink data sending resource corresponding to the frequency identifier or the time identifier is removed from the candidate uplink data sending resources when the candidate uplink data sending resources are determined. Alternatively, based on the frequency identifier or the time identifier, a downlink data receiving resource corresponding to the frequency identifier or the time identifier is removed from the candidate downlink data receiving resources when the candidate downlink data receiving resources are determined.

It is to be noted that, for the implementation, the terminal, after acquiring the downlink transmission resource for the second base station, may send the first resource request indication in the form of the reported signaling, so as to avoid an uplink data sending resource for the first base station from interfering with the downlink transmission resource for the second base station. A network side, for example, the first base station, may transmit the candidate uplink data sending resources, and the terminal can select a transmission resource for sending uplink data to the first base station from the candidate uplink data sending resources. Alternatively, the terminal, after acquiring the uplink transmission resource for the second base station, sends the resource request indication in form of reporting signaling, to avoid a downlink data receiving resource for the first base station from interfering with the uplink transmission resource for the second base station. The network side, for example, the first base station, may transmit the candidate downlink data receiving resources, and the terminal selects a transmission resource for receiving downlink data from the first base station from the candidate downlink data receiving resources.

In addition, it is also to be noted that the network side may also determine whether a phenomenon that the uplink data sending resource interferes with the downlink transmission resource may occur. A device at the network side is taken as an example of the first base station. When the terminal reports uplink data to be transmitted, the resource request indication may be carried in an uplink scheduling request (SR) or a buffer status report (BSR). The first base station, after obtaining the SR or the BSR, may calculate a frequency band of an uplink data sending resource for uplink data transmission with the first base station which may interfere with downlink data transmission for the second base station.

For the technical solution illustrated in FIG. 2, in another possible implementation, the candidate uplink data sending resources include uplink data sending resources on which interference is likely to be generated, or uplink data sending resources on which interference is generated, or uplink data sending resources on which no interference is generated.

The candidate downlink data receiving resources include downlink data receiving resources on which interference is likely to be generated, or downlink data receiving resources on which interference is generated, or downlink data receiving resources on which no interference is generated.

That is, the terminal, after obtaining the candidate uplink data sending resources, may select at least one uplink data sending resource as the transmission resource for sending uplink data to the first base station, or the terminal, after acquiring the candidate downlink data receiving resources, may select at least one downlink data receiving resource as the transmission resource for receiving downlink data from the first base station.

For the technical solution illustrated in FIG. 2, in another possible implementation, the operation that the transmission resource for sending the uplink data to the first base station is determined from the candidate uplink data sending resources according to the downlink transmission resource for the second base station may include the following operations.

An interference condition is determined according to the downlink transmission resource and the candidate uplink data sending resources.

A preset number of transmission resources for sending uplink data to the first base station are selected according to the interference condition, to perform data transmission.

Correspondingly, for the technical solution illustrated in FIG. 2, in another possible implementation, the operation that the transmission resource for receiving the downlink data from the first base station is selected from the candidate downlink data receiving resources according to the uplink transmission resource for the second base station includes the following operations.

An interference condition is determined according to the uplink transmission resource and the candidate downlink data receiving resources.

A preset number of transmission resources for receiving the downlink data from the first base station are selected according to the interference condition, to perform data transmission.

The interference condition may be determined based on the downlink transmission resource and each uplink data sending resource in the candidate uplink data sending resources according to a preset interference detection strategy, or determined through the uplink transmission resource and each downlink data receiving resource in the candidate downlink data receiving resources according to the preset interference detection strategy. For example, the preset interference detection strategy may be a frequency detection strategy. That is, during implementation, the operation that the interference condition is determined according to the downlink transmission resource and the candidate uplink data sending resources may include the following operation.

The terminal compares a frequency band where the downlink transmission resource is located with a frequency band where each of the candidate uplink data sending resources is located, to determine whether there is interference between the downlink transmission resource and each candidate uplink data sending resource. The interference includes cross modulation interference, harmonic interference and harmonic mixing interference. It may be understood that, in response to that a different between the frequency bands is greater than a preset difference threshold value, it may be determined that interference of the candidate uplink data sending resource to the downlink transmission resource is relatively little. In response to that the difference between the frequency bands is less than the preset difference threshold value, it may be determined that the interference of the candidate uplink data sending resource to the downlink transmission resource is relatively strong. The interference increases with the decrease in the difference between the frequency bands.

Correspondingly, the operation that the interference condition is determined according to the uplink transmission resource and the candidate downlink data receiving resources includes the following operation.

A frequency band where the uplink transmission resource is located is compared with a frequency band where each of the candidate downlink data receiving resources is located, to determine whether there is interference between the uplink transmission resource and each candidate downlink data receiving resource. The interference includes cross modulation interference, harmonic interference and harmonic mixing interference.

It is to be noted that, in addition to frequency detection, another interference detection manner may also be used to determine the interference condition of the candidate uplink data sending resources to the downlink transmission resource or the candidate downlink data receiving resources to the uplink transmission resource, which is not limited in the embodiment.

A method for scheduling transmission resources is provided according to the embodiment. The terminal selects from the candidate uplink data sending resources sent by the first base station based on the downlink transmission resource for the second base station, a transmission resource which is capable of avoiding from interfering with the downlink transmission resource for the second base station and used for sending the uplink data to the first base station. Alternatively, the terminal selects from the candidate downlink data receiving resources based on the uplink transmission resource for the second base station, a transmission resource which is capable of avoiding from interfering with the uplink transmission resource for the second base station and used for receiving the downlink data from the first base station. Therefore, scheduling of the base station is avoided, and further the processing load of the base station is reduced.

Second Embodiment

Figure 3:
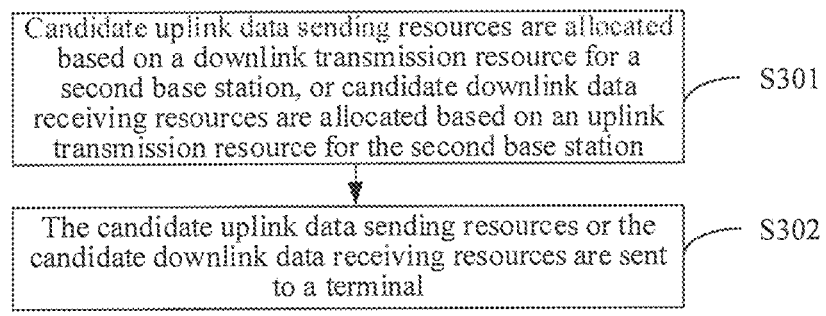
FIG. 3 is a flowchart of another method for scheduling transmission resources according to an embodiment of the disclosure.

Based on the same inventive concept of the abovementioned embodiment, FIG. 3 illustrates a method for scheduling transmission resources provided in an embodiment of the disclosure. The method includes operations in S301 and S302.

In S301, candidate uplink data sending resources are allocated based on a downlink transmission resource for a second base station, or candidate downlink data receiving resources are allocated based on an uplink transmission resource for a second base station.

In S302, the candidate uplink data sending resources or the candidate downlink data receiving resources are sent to a terminal.

The terminal selects a transmission resource for sending uplink data to a first base station from the candidate uplink data sending resources, and selects a transmission resource for receiving downlink data from the first base station from the candidate downlink data receiving resources.

The technical solution illustrated in FIG. 3 may be applied to the base station in the scenario illustrated in FIG. 1. The first base station and the second base station may be an eNB and a gNB respectively, or may further be a network device appearing in the subsequent technical development process and used to implement radio access of a terminal, which is not limited in the embodiment.

In the technical solution illustrated in FIG. 3, since the first base station sends the candidate uplink data sending resources or the candidate downlink data receiving resources to the terminal, and the terminal selects a transmission resource for sending uplink data to the first base station from the candidate uplink data sending resources or selects a transmission resource for receiving downlink data from the first base station from the candidate downlink data receiving resources. Therefore, the terminal selects and schedules the uplink or downlink transmission resource without scheduling of the base station for the uplink or downlink transmission resource of the terminal, thereby reducing a processing load of the base station.

For the technical solution illustrated in FIG. 3, in a possible implementation, before the operation that the candidate uplink data sending resources are allocated based on the downlink transmission resource for the second base station or the candidate downlink data receiving resources are allocated based on the uplink transmission resource for the second base station, the method may further include the following operation.

A resource request indication is received. The resource request indication is used to request allocation of the candidate uplink data sending resources or the candidate downlink data receiving resources.

The resource request indication may be reported in the form of signaling, such as physical-layer signaling, MAC-layer signaling or RRC-side signaling. In addition, corresponding to receiving of the resource request indication, a frequency identifier or a time identifier may further be received. Based on the frequency identifier or the time identifier, an uplink data sending resource corresponding to the frequency identifier or the time identifier is removed from the candidate uplink data sending resources when the candidate uplink data sending resources are determined. Alternatively, based on the frequency identifier or the time identifier, a downlink data receiving resource corresponding to the frequency identifier or the time identifier is removed from the candidate downlink data receiving resources when the candidate downlink data receiving resources are determined.

It may be understood that, in the implementation, the terminal, after acquiring the downlink transmission resource for the second base station, may send a resource request indication in form of reporting signaling, to avoid an uplink data sending resource for the first base station from interfering with the downlink transmission resource for the second base station. The base station may transmit the candidate uplink data sending resources, and the terminal select a transmission resource for sending uplink data to the first base station from the candidate uplink data sending resources. Correspondingly, the terminal, after acquiring the uplink transmission resource for the second base station, may send a resource request indication in form of reporting signaling, to avoid a downlink data receiving resource for the first base station from interfering with the uplink transmission resource for the second base station. The base station may transmit the candidate downlink data receiving resources, and the terminal selects a transmission resource for receiving downlink data from the first base station from the candidate downlink data receiving resources.

In addition, for the technical solution illustrated in FIG. 3, in another possible implementation, the first base station may determine whether a phenomenon that the uplink data sending resource interferes with the downlink transmission resource for the second base station occurs. Therefore, the operation that the candidate uplink data sending resources are allocated based on the downlink transmission resource includes the following operations.

An SR or a BSR is received.

An uplink data sending resource that interferes with the downlink transmission resource is calculated according to the SR or the BSR.

The uplink data sending resource that interferes with the downlink transmission resource is removed from the candidate uplink data sending resources.

For the technical solution illustrated in FIG. 3, the candidate uplink data sending resources include uplink data sending resources on which interference is likely to be generated, or uplink data sending resources on which interference is generated or uplink data sending resources on which no interference is generated.

The candidate downlink data receiving resources include downlink data receiving resources on which interference is likely to be generated, or downlink data receiving resources on which interference is generated or downlink data receiving resources on which no interference is generated.

That is, the terminal, after obtaining the candidate uplink data sending resources or the candidate downlink data receiving resources, may select at least one resource as a transmission resource for sending uplink data to the first base station or a transmission resource for receiving downlink data from the first base station. Scheduling of the base station is avoided, and further the processing load of the base station is reduced.

Third Embodiment

Based on the same inventive concept of the abovementioned embodiments, the technical solutions of the abovementioned embodiments are described in the embodiment using two examples in detail.

First Example

Figure 4:
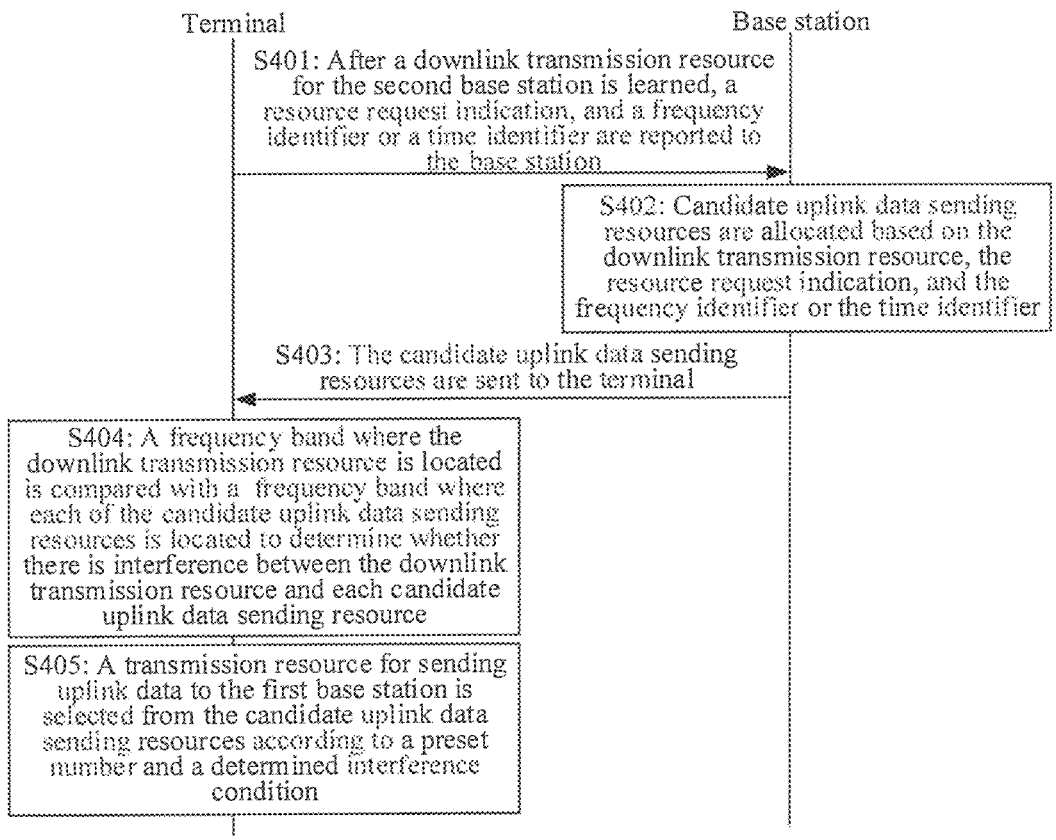
FIG. 4 is a flowchart of a method for scheduling transmission resources according to an embodiment of the disclosure.

Referring to FIG. 4, which illustrates a flow of a method for scheduling transmission resources provided in the embodiment of the disclosure, the flow may include operations in S401 to S405.

In S401, a terminal, after acquiring a downlink transmission resource for the second base station, reports a resource request indication, and a frequency identifier or a time identifier to a first base station.

It is to be noted that the terminal, after acquiring the downlink transmission resource for the second base station, may find that an uplink data sending resource for the first base station may interfere with the downlink transmission resource, and thus the terminal may encapsulate the resource request indication into physical-layer signaling, MAC-layer signaling or RRC-layer signaling and send the encapsulated resource request indication to the first base station. The resource request indication requests the first base station to allocate candidate uplink data sending resources. Based on the frequency identifier or the time identifier, the first base station removes an uplink data sending resource corresponding to the frequency identifier or the time identifier from the candidate uplink data sending resources when allocating the candidate uplink data sending resources, thereby avoiding the first base station from allocating the uplink data sending resource corresponding to the frequency identifier or the time identifier to the terminal.

In S402, the first base station allocates candidate uplink data sending resources based on the downlink transmission resource, the resource request indication, and the frequency identifier or the time identifier.

The first base station may obtain available uplink data sending resources according to the resource request indication, and then remove a uplink data sending resource corresponding to the frequency identifier or the time frequency from the available uplink data sending resources, and according to the downlink transmission resource, generate the candidate uplink data sending resources, which are allocated to the terminal, based on the uplink data sending resources left after removal.

In the example, the candidate uplink data sending resources may include uplink data sending resources on which interference is likely to be generated, or uplink data sending resources on which interference is generated or uplink data sending resources on which no interference is generated.

In S403, the first base station sends the candidate uplink data sending resources to the terminal.

In S404, the terminal compares a frequency band where the downlink transmission resource for the second base station is located with a frequency band where each of the candidate uplink data sending resources is located to determine whether there is interference between the downlink transmission resource and each candidate uplink data sending resource.

The interference includes cross modulation interference, harmonic interference and harmonic mixing interference.

In S405, the terminal selects a transmission resource for sending uplink data to the first base station from the candidate uplink data sending resources according to a preset number and a determined interference condition.

In the example, since the terminal finds the problem of interference with the downlink transmission resource, the first base station allocates the candidate uplink data sending resources to the terminal according to the resource request indication reported by the terminal, and then the terminal selects the uplink transmission resource from the candidate uplink data sending resources. Therefore, scheduling of the base station is avoided, and further a processing load of the base station is reduced.

Figure 5:
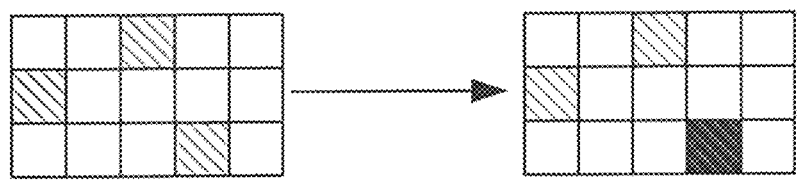
FIG. 5 is a schematic diagram of resources according to an embodiment of the disclosure.

In combination with the solution illustrated in FIG. 4 and referring to the schematic diagram for resources illustrated in FIG. 5, 15 blocks are illustrated for representing 15 resource blocks on the left side of the arrow, and candidate uplink data sending resources are represented by resource blocks filled with slanted lines. After the candidate uplink data sending resources are sent to the terminal, the terminal may select the uplink transmission resource from the candidate uplink data sending resources. As illustrated by the right side of the arrow in FIG. 5, the black resource block is originally one of the candidate uplink data sending resources. The terminal removes the uplink data sending resource represented by the black resource block from the candidate uplink data sending resources because the uplink data sending resource may interfere with downlink data transmission. Therefore, the terminal determines the uplink data sending resources represented by the resource blocks filled with slanted lines on the right side of the arrow as transmission resources for sending uplink data.

Second Example

Figure 6:
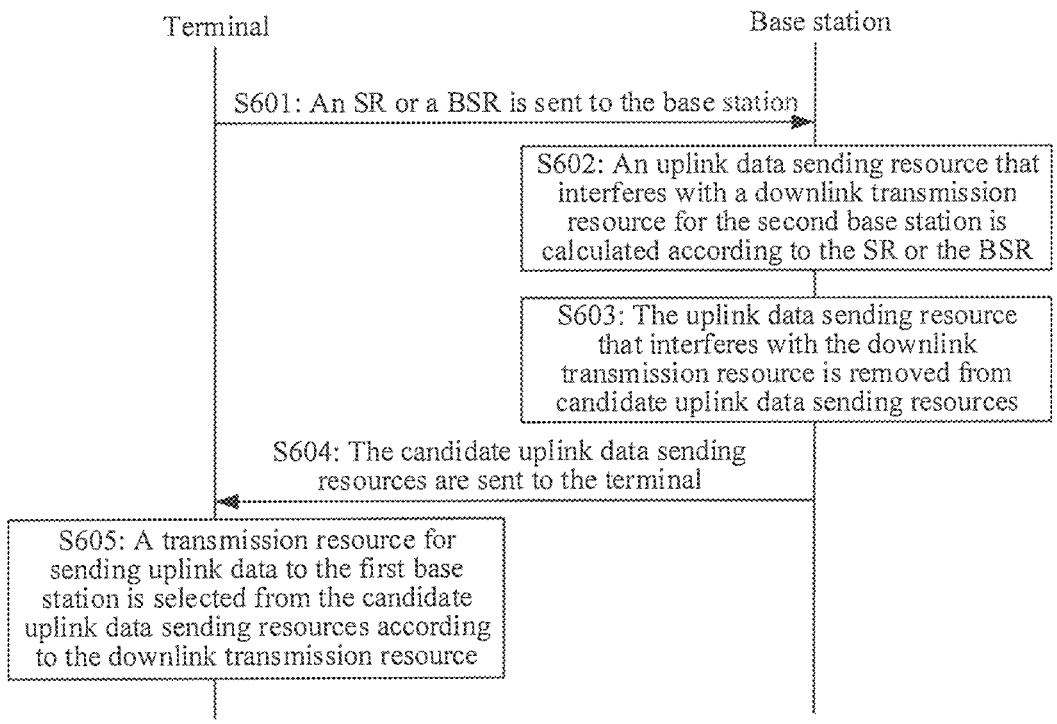
FIG. 6 is a flowchart of another method for scheduling transmission resources according to an embodiment of the disclosure.

In the example, a first base station finds the problem of interference with a downlink transmission resource. Therefore, referring to FIG. 6, the example may include operations in S601 to S604.

In S601, a terminal sends an SR or a BSR to the first base station.

In S602, the first base station calculates an uplink data sending resource that interferes with the downlink transmission resource for the second base station according to the SR or the BSR.

In S603, the first base station removes the uplink data sending resource that interferes with the downlink transmission resource from candidate uplink data sending resources.

In S604, the first base station sends the candidate uplink data sending resources to the terminal.

In the example, the candidate uplink data sending resources may include uplink data sending resources on which interference is likely to be generated, or uplink data sending resources on which interference is generated or uplink data sending resources on which no interference is generated.

In S605, the terminal selects a transmission resource for sending uplink data from the candidate uplink data sending resources according to the downlink transmission resource for the second base station.

An implementation process of the operation in S605 is the same as the operations in S404 and S405 in FIG. 4 and will not be elaborated in the example.

It is to be noted that, for the operations in S601 to S603, the terminal, when reporting uplink data to be transmitted, may send an uplink SR to the first base station and may also report the BSR. The first base station, after obtaining the SR or the BSR, may calculate a frequency band of an uplink data transmission resource, on which uplink data transmission may interfere with downlink data transmission.

In the example, since the first base station finds the problem of the interference with the downlink transmission resource, the first base station, when finding the interference with the downlink transmission resource, sends the candidate uplink data sending resources to the terminal, and the terminal selects the uplink transmission resource from the candidate uplink data sending resources, thereby avoid scheduling of the base station and further reducing a processing load of the base station.

A process that the terminal selects the transmission resource for sending the uplink data to the first base station from the candidate uplink data sending resources is elaborated through flows in the two examples. An example is used below to elaborate how the terminal selects a transmission resource for receiving downlink data from the first base station from candidate downlink data receiving resources.

Third Example

Figure 7:
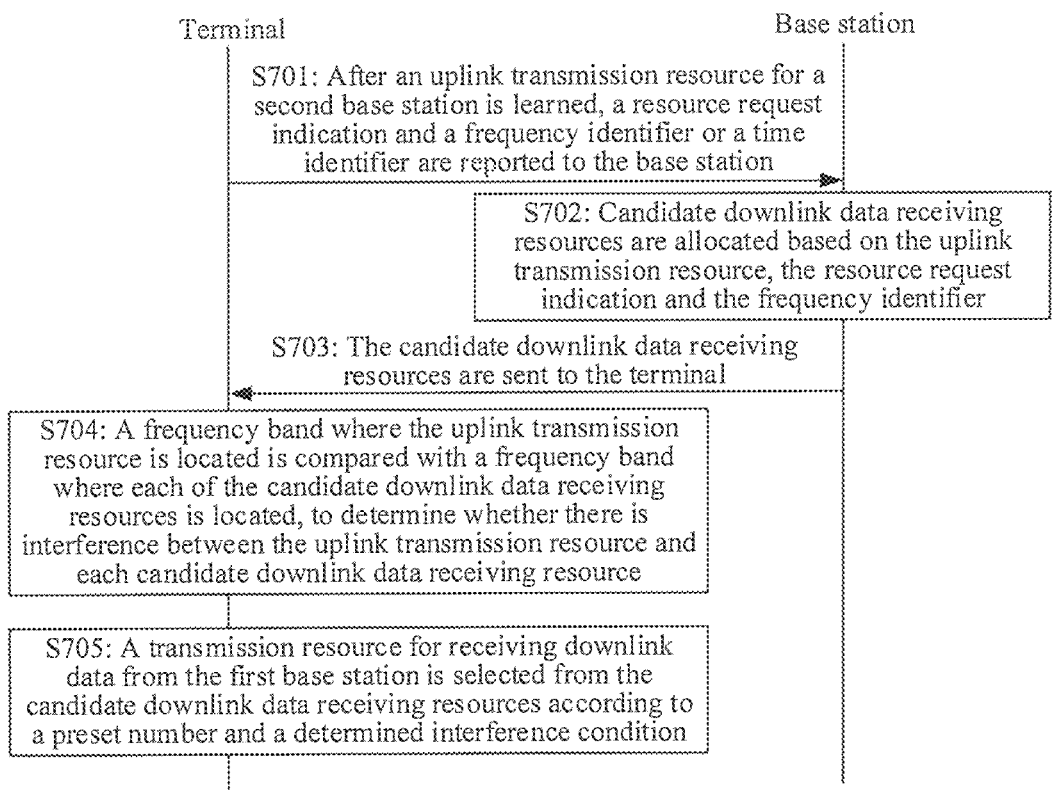
FIG. 7 is a flowchart of another method for scheduling transmission resources according to an embodiment of the disclosure.

FIG. 7 illustrates a flow of a method for scheduling transmission resources provided in the embodiment of the disclosure. The flow may include operations in S701 to S705.

In S701, a terminal, after acquiring an uplink transmission resource for the second base station, reports a resource request indication, and a frequency identifier or a time identifier to a first base station.

It is to be noted that the terminal, after acquiring the uplink transmission resource for the second base station, may find that a downlink data receiving resource for the first base station may interfere with the uplink transmission resource, and thus the terminal may encapsulate the resource request indication into physical-layer signaling, MAC-layer signaling or RRC-layer signaling and send the encapsulated resource request indication to the first base station. The resource request indication requests the first base station to allocate candidate downlink data receiving resources. Based on the frequency identifier or the time identifier, the first base station removes a downlink data receiving resource corresponding to the frequency identifier or the time identifier from the candidate downlink data receiving resources when allocating the candidate downlink data receiving resources, thereby avoiding the first base station from allocating the downlink data receiving resource corresponding to the frequency identifier or the time identifier to the terminal.

In S702, the first base station allocates candidate downlink data receiving resources based on the uplink transmission resource, the resource request indication, and the frequency identifier or the time identifier.

The first base station may obtain available downlink data receiving resources according to the resource request indication, and then remove the downlink data receiving resource corresponding to the frequency identifier or the time frequency from the available downlink data receiving resources, and according to the uplink transmission resource, generate the candidate downlink data receiving resources which is allocated to the terminal, based on the downlink data receiving resources left after removal.

In the example, the candidate downlink data receiving resources include downlink data receiving resources on which interference is likely to be generated, or downlink data receiving resources on which interference is generated or downlink data receiving resources on which no interference is generated.

In S703, the base station sends the candidate downlink data receiving resources to the terminal.

In S704, the terminal compares a frequency band where the uplink transmission resource for the second base station is located with a frequency band where each of the candidate downlink data receiving resources is located, to determine whether there is interference between the uplink transmission resource and each candidate downlink data receiving resource.

The interference includes cross modulation interference, harmonic interference and harmonic mixing interference.

In S705, the terminal selects a transmission resource for receiving downlink data from the first base station from the candidate downlink data receiving resources according to a preset number and a determined interference condition.

In the example, since the terminal finds the problem of interference with the uplink transmission resource, the first base station allocates the candidate downlink data receiving resources to the terminal according to the resource request indication reported by the terminal, and the terminal selects the downlink transmission resource from the candidate downlink data receiving resources. Therefore, scheduling of the base station is avoided, and further a processing load of the base station is reduced.

Fourth Embodiment

Figure 8:
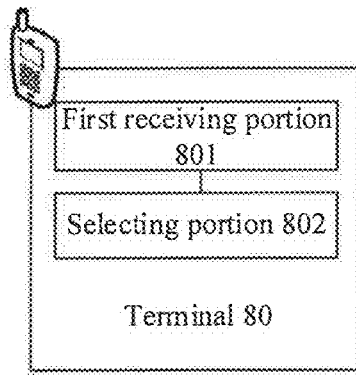
FIG. 8 is a schematic composition diagram of a terminal according to an embodiment of the disclosure.

Based on the same inventive concept of the abovementioned embodiments, FIG. 8 illustrates a terminal 80 provided in the embodiment of the disclosure. The terminal 80 includes a first receiving portion 801 and a selecting portion 802.

The first receiving portion 801 is used to receive candidate uplink data sending resources sent by a first base station or receive candidate downlink data receiving resources sent by a first base station.

The selecting portion 802 is used to determine a transmission resource for sending uplink data to the first base station from the candidate uplink data sending resources according to a downlink transmission resource for a second base station, or determine a transmission resource for receiving downlink data from the first base station from the candidate downlink data receiving resources according to the uplink transmission resource for the second base station.

Figure 9:
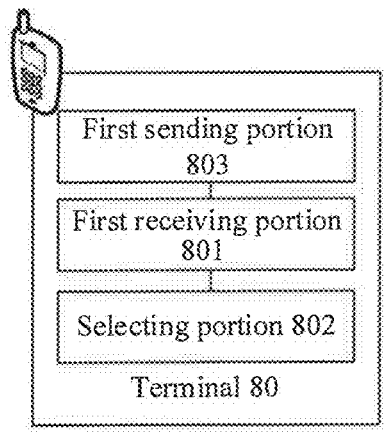
FIG. 9 is a schematic composition diagram of another terminal according to an embodiment of the disclosure.

In a possible implementation, referring to FIG. 9, the terminal 80 further includes a first sending portion 803, used to send a resource request indication to the first base station. The resource request indication requests a base station to allocate the candidate uplink data sending resources or the candidate downlink data receiving resources.

In a possible implementation, the first sending portion 803 is further used to send a frequency identifier or a time identifier to the first base station. Based on the frequency identifier or the time identifier, an uplink data sending resource corresponding to the frequency identifier or the time identifier is removed from the candidate uplink data sending resources when the candidate uplink data sending resources are determined. Alternatively, based on the frequency identifier or the time identifier, a downlink data receiving resource corresponding to the frequency identifier or the time identifier is removed from the candidate downlink data receiving resources when the candidate downlink data receiving resources are determined.

Figure 10:
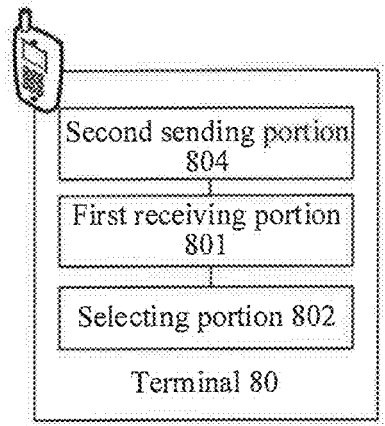
FIG. 10 is a schematic composition diagram of another terminal according to an embodiment of the disclosure.

In a possible implementation, referring to FIG. 10, the terminal 80 further includes a second sending portion 804, used to send a resource request indication to the first base station. The indication is carried by an uplink SR or a BSR. The SR or the BSR is used to calculate an uplink data sending resource that interferes with the downlink transmission resource for the second base station.

Figure 11:
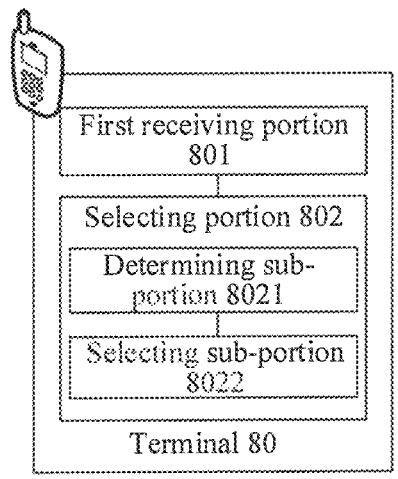
FIG. 11 is a schematic composition diagram of another terminal according to an embodiment of the disclosure.

In a possible implementation, referring to FIG. 11, the selecting portion 802 includes a determining sub-portion 8021 and a selecting sub-portion 8022.

The determining sub-portion 8021 is used to determine an interference condition according to the downlink transmission resource for the second base station and the candidate uplink data sending resources.

The selecting sub-portion 8022 is used to select a preset number of transmission resources for sending uplink data to the first base station according to the interference condition, to perform data transmission.

Alternatively, the determining sub-portion 8021 is used to determine an interference condition according to the uplink transmission resource for the second base station and the candidate downlink data receiving resources.

The determining sub-portion 8022 is used to select a preset number of transmission resources for receiving downlink data from the first base station according to the interference condition, to perform data transmission.

In a possible implementation, the determining sub-portion 8021 is used to compare a frequency band where the downlink transmission resource is located with a frequency band where each of the candidate uplink data sending resources is located, to determine whether there is interference between the downlink transmission resource and each candidate uplink data sending resource.

Alternatively, the determining sub-portion 8021 is used to compare a frequency band where the uplink transmission resource is located with a frequency band where each of the candidate downlink data receiving resources is located, to determine whether there is interference between the uplink transmission resource and each candidate downlink data receiving resource.

The interference includes cross modulation interference, harmonic interference and harmonic mixing interference.

It may be understood that, in the embodiment and other embodiments, "portion" may refer to a circuit portion, a processor portion, a program portion or a software portion and the like. Of course, the "portion" may also refer to a unit, or may also be a module and non-modular.

In addition, the components in the embodiment may be integrated into a processing unit, or may also be independent physical units. Alternatively, two or more units may also be integrated into a unit. The integrated unit may be implemented in a hardware form and may also be implemented in form of software function module.

When being implemented in the form of software function module and sold or used as an independent product, the above integrated unit may also be stored in a computer-readable storage medium. Based on such an understanding, an essential part or a part making contributions to the conventional art of the technical solutions of the embodiments of the disclosure, or a part or all of the technical solutions may be embodied in form of software product. The computer software product is stored in a storage medium, including multiple instructions used to enable a computer device (which may be a personal computer, a server, network equipment or the like) or a processor to execute all or a part of operations of the method in the embodiment. The above storage medium includes a media capable of storing program codes such as a U-disk, mobile storage equipment, a read only memory (ROM), a random access memory (RAM), a magnetic disk or an optical disk.

Therefore, a computer-readable medium is provided according to an embodiment, which stores a program for scheduling transmission resources, the program for scheduling transmission resources is executed by at least one processor to implement the following operations.

Candidate uplink data sending resources sent by the first base station are received, or, candidate downlink data receiving resources sent by the first base station are received.

A transmission resource for sending uplink data to the first base station is determined from the candidate uplink data sending resources according to a downlink transmission resource for the second base station. Alternatively, a transmission resource for receiving downlink data from the first base station is determined from the candidate downlink data receiving resources according to the uplink transmission resource for the second base station.

As another embodiment, the program for scheduling transmission resources is run by the processor to further execute the following operation.

A resource request indication is sent to the first base station. The resource request indication is used to request the first base station to allocate the candidate uplink data sending resources or the candidate downlink data receiving resources.

As another embodiment, the program for scheduling transmission resources is run by the processor to further execute the following operation.

A frequency identifier or a time identifier is sent to the first base station. Based on the frequency identifier or the time identifier, an uplink data sending resource corresponding to the frequency identifier or the time identifier is removed from the candidate uplink data sending resources when the candidate uplink data sending resources are determined. Alternatively, based on the frequency identifier or the time identifier, a downlink data receiving resource corresponding to the frequency identifier or the time identifier is removed from the candidate downlink data receiving resources when the candidate downlink data receiving resources are determined.

As another embodiment, the program for scheduling transmission resources is run by the processor to further execute the following operation.

A resource request indication is sent to the first base station. The indication is carried through an uplink SR or a BSR. The SR or the BSR is used to calculate an uplink data sending resource that interferes with the downlink transmission resource.

As another embodiment, the program for scheduling transmission resources is run by the processor to further execute the following operations.

An interference condition is determined according to the downlink transmission resource and the candidate uplink data sending resources.

A preset number of transmission resources for sending the uplink data to the base station are selected according to the interference condition, to perform data transmission.

As another embodiment, the program for scheduling transmission resources is run by the processor to further execute the following operations.

An interference condition is determined according to the uplink transmission resource and the candidate downlink data receiving resources.

A preset number of transmission resources for receiving downlink data from the first base station are selected according to the interference condition, to perform data transmission.

As another embodiment, the program for scheduling transmission resources is run by the processor to further execute the following operation.

A frequency band where the downlink transmission resource is located is compared with a frequency band where each of the candidate uplink data sending resource is located, to determine whether there is interference between the downlink transmission resource and each candidate uplink data sending resource. The interference includes cross modulation interference, harmonic interference and harmonic mixing interference.

As another embodiment, the program for scheduling transmission resources is run by the processor to further execute the following operation.

A frequency band where the uplink transmission resource is located is compared with a frequency band where each of the candidate downlink data receiving resources is located, to determine whether there is interference between the uplink transmission resource and each candidate downlink data receiving resource. The interference includes cross modulation interference, harmonic interference and harmonic mixing interference.

Figure 12:
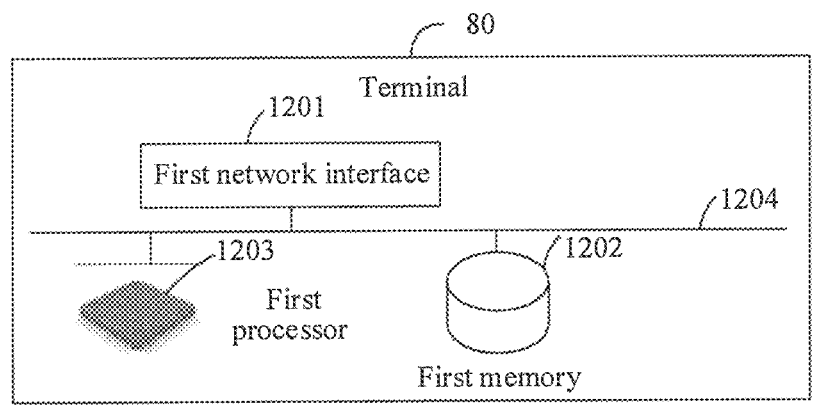
FIG. 12 is a schematic hardware structure diagram of a terminal according to an embodiment of the disclosure.

Based on the terminal 80 and the computer-readable medium described above, referring to FIG. 12, which illustrates a hardware structure of the terminal 80 provided in the embodiment of the disclosure, the terminal 80 may include a first network interface 1201, a first memory 1202 and a first processor 1203. The components are coupled together through a bus system 1204. It may be understood that the bus system 1204 is used to implement connection and communication between these components. In addition to a data bus, the bus system 1204 includes a power bus, a control bus and a state signal bus. However, for clear description, various buses in FIG. 12 are represented as the bus system 1204.

Herein, the first network interface 1201 is used to receive and send a signal in a process of receiving and sending information with another external network element.

The first memory 1202 is used to store a computer program capable of being run in the first processor 1203.

The first processor 1203 is used to run the computer program to execute the following operations.

Candidate uplink data sending resources sent by the first base station are received, or candidate downlink data receiving resources sent by the first base station are received.

A transmission resource for sending uplink data to the first base station is determined from the candidate uplink data sending resources according to a downlink transmission resource for a second base station. Alternatively, the transmission resource for receiving downlink data from the first base station is determined from the candidate downlink data receiving resources according to the uplink transmission resource for the second base station.

It can be understood that the first memory 1202 in the embodiment of the disclosure may be a volatile memory or a nonvolatile memory, or may include both the volatile and nonvolatile memories. The nonvolatile memory may be a ROM, a programmable ROM (PROM), an erasable PROM (EPROM), an electrically EPROM (EEPROM) or a flash memory. The volatile memory may be a RAM, which is used as an external high-speed cache. In exemplary but non-limiting description, RAMs in various forms are available, such as a static RAM (SRAM), a dynamic RAM (DRAM), a synchronous DRAM (SDRAM), a double data rate SDRAM (DDRSDRAM), an enhanced SDRAM (ES-DRAM), a synchlink DRAM (SLDRAM) and a direct rambus RAM (DRRAM). The first memory 1202 of a system and method described in the disclosure is intended to include, but be not limited to, these memories and memories of any other proper types.

The first processor 1203 may be an integrated circuit chip having a signal processing capability. In an implementation process, each operation of the above method may be implemented by an integrated logic circuit of hardware in the first processor 1203 or an instruction in a software form. The above first processor 1203 may be a universal processor, a digital signal processor (DSP), an application specific integrated circuit (ASIC), a field programmable gate array (FPGA) or another programmable logic device (PLD), a discrete gate, a transistor logical device or a discrete hardware component, which can implement or execute each method, operation and logical block diagram disclosed in the embodiment of the disclosure. The universal processor may be a microprocessor or the processor may also be any conventional processor and the like. The operations of the method disclosed in combination with the embodiment of the disclosure may be directly implemented by a hardware decoding processor or a combination of hardware and software modules in the decoding processor. The software module may be located in a mature storage medium in the art such as a RAM, a flash memory, a ROM, a PROM or EEPROM and a register. The storage medium is located in the first memory 1202. The first processor 1203 reads information in the first memory 1202 and implements the operations of the method in combination with hardware thereof.

It may be understood that these embodiments described in the disclosure may be implemented by hardware, software, firmware, middleware, a microcode or a combination thereof. In implementation with the hardware, the processing unit may be implemented in one or more ASICs, DSPs, DSP Devices (DSPDs), PLDs, FPGAs, universal processors, controllers, microcontrollers, microprocessors, other electronic units used to execute the functions in the disclosure or combinations thereof.

In implementation with the software, the technology of the disclosure may be implemented through the modules (for example, processes and functions) executing the functions in the disclosure. A software code may be stored in the memory and executed by the processor. The memory may be implemented in the processor or outside the processor.

As another embodiment, the first processor 1203 is further used to run the computer program to execute the following operation.

A resource request indication is sent to the first base station. The resource request indication is used to request the first base station to allocate the candidate uplink data sending resources or the candidate downlink data receiving resources.

As another embodiment, the first processor 1203 is further used to run the computer program to execute the following operation.

A frequency identifier or a time identifier is sent to the first base station. Based on the frequency identifier or the time identifier, an uplink data sending resource corresponding to the frequency identifier or the time identifier is removed from the candidate uplink data sending resources when the candidate uplink data sending resources are determined. Alternatively, based on the frequency identifier or the time identifier, a downlink data receiving resource corresponding to the frequency identifier or the time identifier is removed from the candidate downlink data receiving resources when the candidate downlink data receiving resources are determined.

As another embodiment, the first processor 1203 is further used to run the computer program to execute the following operation.

A resource request indication is sent to the first base station. The indication is carried by an uplink SR or a BSR. The SR or the BSR is used to calculate an uplink data sending resource that interferes with the downlink transmission resource.

As another embodiment, the first processor 1203 is further used to run the computer program to execute the following operations.

An interference condition is determined according to the downlink transmission resource and the candidate uplink data sending resources.

A preset number of transmission resources for sending the uplink data to the first base station are selected according to the interference condition, to perform data transmission.

As another embodiment, the first processor 1203 is further used to run the computer program to execute the following operations.

An interference condition is determined according to the uplink transmission resource and the candidate downlink data receiving resources.

A preset number of transmission resources for receiving the downlink data from the first base station are selected according to the interference condition, to perform data transmission.

As another embodiment, the first processor 1203 is further used to run the computer program to execute the following operation.

A frequency band where the downlink transmission resource is located is compared with a frequency band where each of the candidate uplink data sending resources is located, to determine whether there is interference between the downlink transmission resource and each candidate uplink data sending resource. The interference includes cross modulation interference, harmonic interference and harmonic mixing interference.

As another embodiment, the first processor 1203 is further used to run the computer program to execute the following operation.

A frequency band where the uplink transmission resource is located is compared with a frequency band where each of the candidate downlink data receiving resources is located, to determine whether there is interference between the uplink transmission resource and each candidate downlink data receiving resource. The interference includes cross modulation interference, harmonic interference and harmonic mixing interference.

Fifth Embodiment

Figure 13:
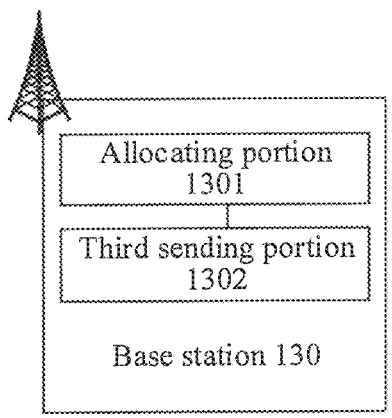
FIG. 13 is a schematic composition diagram of a base station according to an embodiment of the disclosure.

Based on the same technical concept of the abovementioned embodiments, FIG. 13 illustrates a base station 130 provided in the embodiment of the disclosure. The base station 130 may include an allocating portion 1301 and a third sending portion 1302.

The allocating portion 1301 is used to allocate candidate uplink data sending resources based on a downlink transmission resource for a second base station or allocate candidate downlink data receiving resources based on an uplink transmission resource for a second base station.

The third sending portion 1302 is used to send the candidate uplink data sending resources or the candidate downlink data receiving resources to a terminal. The candidate uplink data sending resources are used by the terminal to select the transmission resource for sending uplink data to the base station, and the candidate downlink data receiving resources are used by the terminal to select the transmission resource for receiving downlink data from the base station.

Figure 14:
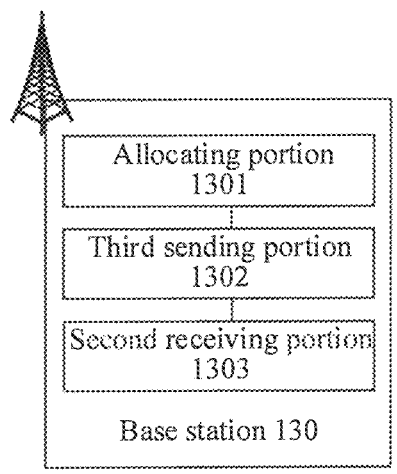
FIG. 14 is a schematic composition diagram of another base station according to an embodiment of the disclosure.

In a possible implementation, referring to FIG. 14, the base station 130 further includes a second receiving portion 1303, used to receive a resource request indication. The resource request indication is used to request allocation of the candidate uplink data sending resources or the candidate downlink data receiving resources.

In a possible implementation, the second receiving portion 1303 is further used to receive a frequency identifier or a time identifier. Based on the frequency identifier or the time identifier, an uplink data sending resource corresponding to the frequency identifier or the time identifier is removed from the candidate uplink data sending resources when the candidate uplink data sending resources are determined. Alternatively, based on the frequency identifier or the time identifier, a downlink data receiving resource corresponding to the frequency identifier or the time identifier is removed from the candidate downlink data receiving resources when the candidate downlink data receiving resources are determined.

In a possible implementation, the allocating portion 1301 is used to receive an uplink SR or a BSR, calculate an uplink data sending resource that interferes with the downlink transmission resource according to the SR or the BSR and remove the uplink data sending resource that interferes with the downlink transmission resource from the candidate uplink data sending resources.

It may be understood that, in the embodiment and other embodiments, "portion" may refer to a circuit portion, a processor portion, a program portion or a software portion and the like. Of course, the "portion" may also refer to a unit, or may also be a module and non-modular.

In addition, the components in the embodiment may be integrated into a processing unit, or may also independent physical units. Alternatively, two or more units may also be integrated into a unit. The integrated unit may be implemented in a hardware form and may also be implemented in form of software function module.

When being implemented in the form of software function module and sold or used as an independent product, the above integrated unit may also be stored in a computer-readable storage medium. Based on such an understanding, an essential part or a part making contributions to the conventional art of the technical solutions of the embodiments of the disclosure, or a part or all of the technical solutions may be embodied in form of software product. The computer software product is stored in a storage medium, including multiple instructions used to enable a computer device (which may be a personal computer, a server, network equipment or the like) or a processor to execute all or a part of operations of the method in the embodiment. The above storage medium includes a media capable of storing program codes such as a U-disk, mobile storage equipment, a read only memory (ROM), a random access memory (RAM), magnetic disk or an optical disk.

Therefore, a computer-readable medium is provided according to the embodiment, which stores a program for scheduling transmission resources. The program for scheduling transmission resources is executed by at least one processor to implement the following operations.

Candidate uplink data sending resources are allocated based on a downlink transmission resource for a second base station, or candidate downlink data receiving resources are allocated based on an uplink transmission resource for a second base station.

The candidate uplink data sending resources or the candidate downlink data receiving resources are sent to a terminal. The candidate uplink data sending resources are used by a terminal to select a transmission resource for sending uplink data to the base station, and the candidate downlink data receiving resources are used by the terminal to select a transmission resource for receiving downlink data from the base station.

As another embodiment, the program for scheduling transmission resources is run by the processor to further execute the following operation.

A resource request indication is received. The resource request indication is used to request allocation of the candidate uplink data sending resources or the candidate downlink data receiving resources.

As another embodiment, the program for scheduling transmission resources is run by the processor to further execute the following operation.

A frequency identifier or a time identifier is received. Based on the frequency identifier or the time identifier, an uplink data sending resource corresponding to the frequency identifier or the time identifier is removed from the candidate uplink data sending resources when the candidate uplink data sending resources are determined. Alternatively, based on the frequency identifier or the time identifier, a downlink data receiving resource corresponding to the frequency identifier or the time identifier is removed from the candidate downlink data receiving resources when the candidate downlink data receiving resources are determined.

As another embodiment, the program for scheduling transmission resources is run by the processor to further execute the following operations.

An uplink SR or a BSR is received.

An uplink data sending resource that interferes with the downlink transmission resource for the second base station is calculated according to the SR or the BSR.

The uplink data sending resource that interferes with the downlink transmission resource is removed from the candidate uplink data sending resources.

Figure 15:
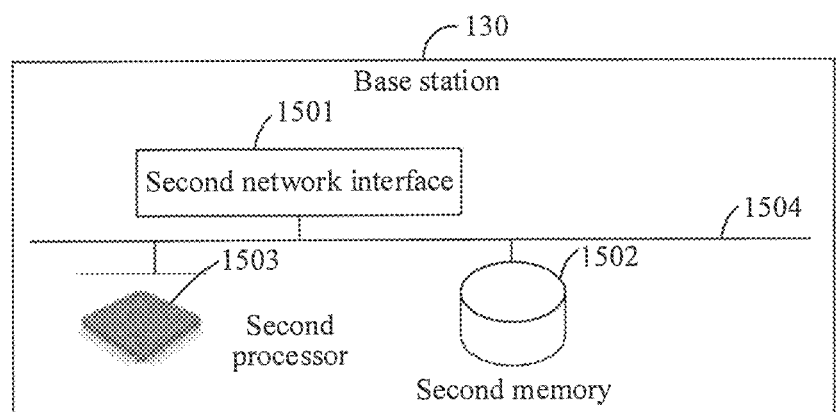
FIG. 15 is a schematic hardware structure diagram of a base station according to an embodiment of the disclosure.

Based on the base station 130 and the computer-readable medium described above, FIG. 15 illustrates a hardware structure of the base station 130 provided in the embodiment of the disclosure. The base station 130 may include a second network interface 1501, a second memory 1502 and a second processor 1503. The components are coupled together through a bus system 1504. It may be understood that the bus system 1504 is used to implement connection and communication between these components. In addition to a data bus, the bus system 1504 includes a power bus, a control bus and a state signal bus. However, for clear description, various buses in FIG. 14 are represented as the bus system 1504.

Herein, the second network interface 1501 is used to receive and send a signal in a process of receiving and sending information with another external network element.

The second memory 1502 is used to store a computer program capable of being run in the second processor 1503.

The second processor 1503 is used to run the computer program to execute the following operations.

Candidate uplink data sending resources are allocated based on a downlink transmission resource for a second base station, or candidate downlink data receiving resources are allocated based on an uplink transmission resource for a second base station.

The candidate uplink data sending resources or the candidate downlink data receiving resources are sent to a terminal. The candidate uplink data sending resources are used by a terminal to select a transmission resource for sending uplink data to the base station, and the candidate downlink data receiving resources are used by the terminal to select a transmission resource for receiving downlink data from the base station.

It can be understood that the second memory 1502 in the embodiment of the disclosure may be a volatile memory or a nonvolatile memory, or may include both the volatile and nonvolatile memories. The nonvolatile memory may be a ROM, a programmable ROM (PROM), an erasable PROM (EPROM), an electrically EPROM (EEPROM) or a flash memory. The volatile memory may be a RAM, which is used as an external high-speed cache. In exemplary but non-limiting description, RAMs in various forms are available, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM) and a direct rambus RAM (DRRAM). The second memory 1502 of a system and method described in the disclosure includes, but is not limited to, these memories and memories of any other proper types.

The second processor 1503 may be an integrated circuit chip having a signal processing capability. In an implementation process, each operation of the above method may be implemented by an integrated logic circuit of hardware in the second processor 1503 or an instruction in a software form. The above second processor 1503 may be a universal processor, a digital signal processor (DSP), an application specific integrated circuit (ASIC), a field programmable gate array (FPGA) or another programmable logic device (PLD), a discrete gate, a transistor logical device or a discrete hardware component, which can implement or execute each method, operation and logical block diagram disclosed in the embodiment of the disclosure. The universal processor may be a microprocessor or the processor may also be any conventional processor and the like. The operations of the method disclosed in combination with the embodiment of the disclosure may be directly implemented by a hardware decoding processor or a combination of hardware and software modules in the decoding processor. The software module may be located in a mature storage medium in the art such as a RAM, a flash memory, a ROM, a PROM or EEPROM and a register. The storage medium is located in the second memory 1502. The second processor 1503 reads information in the second memory 1502 and implements the operations of the method in combination with hardware thereof.

It may be understood that these embodiments described in the disclosure may be implemented by hardware, software, firmware, middleware, a microcode or a combination thereof. In implementation with the hardware, the processing unit may be implemented in one or more ASICs, DSPs, DSP Devices (DSPDs), PLDs, FPGAs, universal processors, controllers, microcontrollers, microprocessors, other electronic units used to execute the functions in the disclosure or combinations thereof.

In implementation with the software, the technology of the disclosure may be implemented through the modules (for example, processes and functions) executing the functions in the disclosure. A software code may be stored in the memory and executed by the processor. The memory may be implemented in the processor or outside the processor.

As another embodiment, the second processor 1503 is further used to run the computer program to execute the following operation.

A resource request indication is received. The resource request indication is used to request allocation of the candidate uplink data sending resources or the candidate downlink data receiving resources.

As another embodiment, the second processor 1503 is further used to run the computer program to execute the following operation.

A frequency identifier or a time identifier is received. Based on the frequency identifier or the time identifier, an uplink data sending resource corresponding to the frequency identifier or the time identifier is removed from the candidate uplink data sending resources when the candidate uplink data sending resources are determined. Alternatively, based on the frequency identifier or the time identifier, a downlink data receiving resource corresponding to the frequency identifier or the time identifier is removed from the candidate downlink data receiving resources when the candidate downlink data receiving resources are determined.

As another embodiment, the second processor 1503 is further used to run the computer program to execute the following operations.

An uplink SR or a BSR is received.

An uplink data sending resource that interferes with the downlink transmission resource is calculated according to the SR or the BSR.

The uplink data sending resource that interferes with the downlink transmission resource is removed from the candidate uplink data sending resources.

Sixth Embodiment

Figure 16:
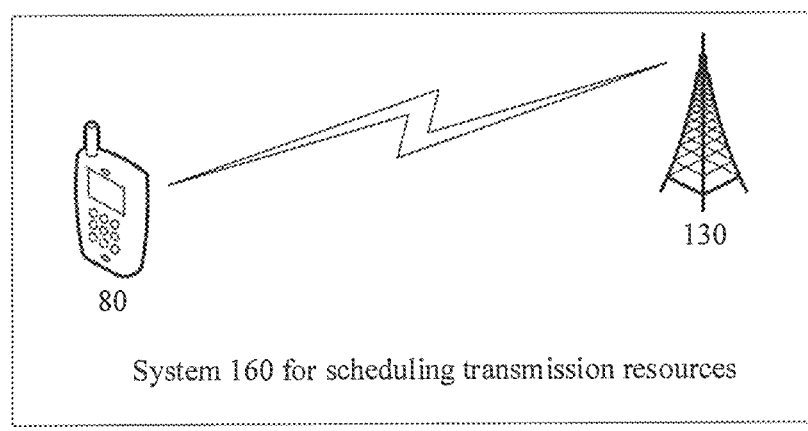
FIG. 16 is a schematic composition diagram of a system for scheduling transmission resources according to an embodiment of the disclosure.

Based on the same inventive concept of the abovementioned embodiments, FIG. 16 illustrates a system 160 for scheduling transmission resources provided in the embodiment of the disclosure. The system 150 includes a terminal 80 and a base station 130.

The base station 130 is used to allocate candidate uplink data sending resources based on a downlink transmission resource for a second base station or allocate candidate downlink data receiving resources based on an uplink transmission resource for the second base station, and send the candidate uplink data sending resources or the candidate downlink data receiving resources to the terminal 80. The candidate uplink data sending resources are used by a terminal to select a transmission resource for sending uplink data to the base station, and the candidate downlink data receiving resources are used by the terminal to select a transmission resource for receiving downlink data from the base station.

The terminal 80 is used to receive the candidate uplink data sending resources or receive the candidate downlink data receiving resources, and determine a transmission resource for sending uplink data to the base station from the candidate uplink data sending resources according to the downlink transmission resource, or determine a transmission resource for receiving downlink data from the base station from the candidate downlink data receiving resources according to the uplink transmission resource.

In an implementation process, the terminal 80 in the embodiment may preferably be the terminal 80 in any abovementioned embodiment, and the base station 130 may preferably be the base station 130 in any abovementioned embodiment.

Those skilled in the art should know that the embodiment of the disclosure may be embodied as a method, a system or a computer program product. Therefore, the disclosure may be in a form of hardware embodiment, software embodiment or combined embodiment of software and hardware. Moreover, the disclosure may be a form of computer program product implemented on one or more computer-available storage media (including, but be not limited to, a disk memory and an optical memory) including computer-available program codes.

The disclosure is described with reference to flowcharts and/or block diagrams of the method, device (system) and computer program product according to the embodiments of the disclosure. It is to be understood that each flow in the flowcharts and/or each block in the block diagrams and a combination of the flows in the flowcharts and/or a combination of blocks in the block diagrams may be implemented by computer program instructions. These computer program instructions may be provided for a universal computer, a dedicated computer, an embedded processor or a processor of other programmable data processing device to generate a machine, so that the instructions executed through the computer or the processor of the other programmable data processing device can generate a device for realizing a function specified in one or more flows in the flowcharts and/or one or more blocks in the block diagrams.

These computer program instructions may also be stored in a computer-readable memory capable of guiding the computer or the other programmable data processing device to operate in a manner, so that the instructions stored in the computer-readable memory generate a product including an instruction device. The instruction device can realize the function specified in one or more flows in the flowcharts and/or one or more blocks in the block diagrams.

These computer program instructions may further be loaded onto the computer or the other programmable data processing device, so that a series of operations are executed on the computer or the other programmable data processing device to generate processing implemented by the computer, and operations for realizing the function specified in one or more flows in the flowcharts and/or one or more blocks in the block diagrams are provided by the instructions executed on the computer or the other programmable data processing device.

The foregoing only describes the preferred embodiment of the disclosure and is not intended to limit the scope of protection of the disclosure.

INDUSTRIAL APPLICABILITY

In the embodiments, the terminal selects from the candidate uplink data sending resources based on the downlink transmission resource for a second base station, a transmission resource which is capable of avoiding from interfering with the downlink transmission resource and used for sending uplink data to a first base station. Alternatively, the terminal selects from the candidate downlink data receiving resources based on the uplink transmission resource for a second base station, a transmission resource which is capable of avoiding from interfering with the uplink transmission resource and used for receiving downlink data from the first base station. Therefore, scheduling of the base station is avoided, and further the processing load of the base station is reduced.

The invention claimed is:

1. A method for scheduling transmission resources, applied to a terminal and comprising:
    receiving candidate uplink data sending resources sent by a first base station, or receiving candidate downlink data receiving resources sent by the first base station; and
    determining a transmission resource for sending uplink data to the first base station from the candidate uplink data sending resources according to a downlink transmission resource for a second base station, or determining a transmission resource for receiving downlink data from the first base station from the candidate downlink data receiving resources according to an uplink transmission resource for the second base station,
    wherein the candidate uplink data sending resources comprise one of the following: uplink data sending resources on which interference is likely to be generated, uplink data sending resources on which interference is generated or uplink data sending resources on which no interference is generated; and
    the candidate downlink data receiving resources comprise one of the following: downlink data receiving resources on which interference is likely to be generated, downlink data receiving resources on which interference is generated or downlink data receiving resources on which no interference is generated.

2. The method of claim 1, wherein before receiving the candidate uplink data sending resources sent by the first base station or receiving the candidate downlink data receiving resources sent by the first base station, the method further comprises:
    sending a resource request indication to the first base station, wherein the resource request indication is used to request the first base station to allocate the candidate uplink data sending resources or the candidate downlink data receiving resources.

3. The method of claim 2, wherein the method further comprises: sending a frequency identifier or a time identifier to the first base station, wherein based on the frequency identifier or the time identifier, an uplink data sending resource corresponding to the frequency identifier or the time identifier is removed from the candidate uplink data sending resources when the candidate uplink data sending resources are determined, or based on the frequency identifier or the time identifier, a downlink data receiving resource corresponding to the frequency identifier or the time identifier is removed from the candidate downlink data receiving resources when the candidate downlink data receiving resources are determined.

4. The method of claim 1, wherein the method further comprises: sending a resource request indication to the second base station, wherein the indication is carried through an uplink scheduling request (SR) or a buffer status report (BSR), and the SR or the BSR is used to calculate an uplink data sending resource that interferes with the downlink transmission resource.

5. The method of claim 1, wherein determining the transmission resource for sending uplink data to the first base station from the candidate uplink data sending resources according to the downlink transmission resource for the second base station comprises:
  determining an interference condition according to the downlink transmission resource and the candidate uplink data sending resources; and
  selecting a preset number of transmission resources for sending uplink data to the first base station according to the interference condition, to perform data transmission.

6. The method of claim 1, wherein determining the transmission resource for receiving downlink data from the first base station from the candidate downlink data receiving resources according to the uplink transmission resource for the second base station comprises:
  determining an interference condition according to the uplink transmission resource and the candidate downlink data receiving resources; and
  selecting a preset number of transmission resources for receiving downlink data from the first base station according to the interference condition, to perform data transmission.

7. A terminal, comprising a first network interface, a first memory and a first processor, wherein
  the first network interface is used to receive and send a signal in a process of receiving and sending information with another external network element;
  the first memory is used to store a computer program capable of being run in the first processor; and
  the first processor is used to run the computer program to execute operations of:
  controlling the first network interface to receive candidate uplink data sending resources sent by a first base station, or receiving candidate downlink data receiving resources sent by the first base station; and
  determining a transmission resource for sending uplink data to the first base station from the candidate uplink data sending resources according to a downlink transmission resource for a second base station, or determining a transmission resource for receiving downlink data from the first base station from the candidate downlink data receiving resources according to an uplink transmission resource for the second base station,
  wherein the candidate uplink data sending resources comprise one of the following: uplink data sending resources on which interference is likely to be generated, uplink data sending resources on which interference is generated or uplink data sending resources on which no interference is generated; and
  the candidate downlink data receiving resources comprise one of the following: downlink data receiving resources on which interference is likely to be generated, downlink data receiving resources on which interference is generated or downlink data receiving resources on which no interference is generated.

8. The terminal of claim 7, wherein the first processor is used to run the computer program to execute operations of:
before controlling the first network interface to receive the candidate uplink data sending resources sent by the first base station or receiving the candidate downlink data receiving resources sent by the first base station,
  sending a resource request indication to the first base station, wherein the resource request indication is used to request the first base station to allocate the candidate uplink data sending resources or the candidate downlink data receiving resources.

9. The terminal of claim 8, wherein the first processor is used to run the computer program to execute operations of:
  sending a frequency identifier or a time identifier to the first base station, wherein based on the frequency identifier or the time identifier, an uplink data sending resource corresponding to the frequency identifier or the time identifier is removed from the candidate uplink data sending resources when the candidate uplink data sending resources are determined, or based on the frequency identifier or the time identifier, a downlink data receiving resource corresponding to the frequency identifier or the time identifier is removed from the candidate downlink data receiving resources when the candidate downlink data receiving resources are determined.

10. The terminal of claim 7, wherein the first processor is used to run the computer program to execute operations of:
  sending a resource request indication to the first base station, wherein the indication is carried through an uplink scheduling request (SR) or a buffer status report (BSR), and the SR or the BSR is used to calculate an uplink data sending resource that interferes with the downlink transmission resource.

11. The terminal of claim 7, wherein the first processor is used to run the computer program to execute operations of:
  determining an interference condition according to the downlink transmission resource and the candidate uplink data sending resources; and
  selecting a preset number of transmission resources for sending uplink data to the first base station according to the interference condition, to perform data transmission.

12. The terminal of claim 7, wherein the first processor is used to run the computer program to execute operations of:
  determining an interference condition according to the uplink transmission resource and the candidate downlink data receiving resources; and
  selecting a preset number of transmission resources for receiving downlink data from the first base station according to the interference condition, to perform data transmission.

13. The terminal of claim 11, wherein the first processor is used to run the computer program to execute operations of:
  comparing a frequency band where the downlink transmission resource is located with a frequency band where each of the candidate uplink data sending resources is located, to determine whether there is interference between the downlink transmission resource and each candidate uplink data sending resource, wherein the interference comprises cross modulation interference, harmonic interference and harmonic mixing interference.

14. The terminal of claim 12, wherein the first processor is used to run the computer program to execute operations of:
  comparing a frequency band where the uplink transmission resource is located with a frequency band where each of the candidate downlink data receiving resources is located, to determine whether there is interference between the uplink transmission resource and each candidate downlink data receiving resource, wherein the interference comprises cross modulation interference, harmonic interference and harmonic mixing interference.

15. The terminal of claim 8, wherein the first processor is used to run the computer program to execute operations of: before sending the resource request indication to the first base station,
  acquiring the downlink transmission resource for the second base station, or acquiring the uplink transmission resource for the second base station.

16. The terminal of claim 13, wherein the first processor is used to run the computer program to execute operations of:
  in response to that a different between the frequency bands is greater than a preset difference threshold value, determining that interference of the candidate uplink data sending resource to the downlink transmission resource is little; and
  in response to that the difference between the frequency bands is less than the preset difference threshold value, determining that the interference of the candidate uplink data sending resource to the downlink transmission resource is strong,
  wherein the interference increases with a decrease in the difference between the frequency bands.

17. The terminal of claim 14, wherein the first processor is used to run the computer program to execute operations of:
  in response to that a different between the frequency bands is greater than a preset difference threshold value, determining that interference of the candidate downlink data receiving resource to the uplink transmission resource is little; and
  in response to that the difference between the frequency bands is less than the preset difference threshold value, determining that the interference of the candidate downlink data receiving resource to the uplink transmission resource is strong,
  wherein the interference increases with a decrease in the difference between the frequency bands.

18. The terminal of claim 8, wherein the resource request indication is reported in a form of signaling, and a format of the reported signaling is physical-layer signaling, media access control (MAC)-layer signaling or radio resource control (RRC)-side signaling.

19. A method for scheduling transmission resources, applied to a first base station and comprising:
  allocating candidate uplink data sending resources based on a downlink transmission resource for a second base station, or allocating candidate downlink data receiving resources based on an uplink transmission resource for the second base station; and
  sending the candidate uplink data sending resources or the candidate downlink data receiving resources to a terminal, wherein the candidate uplink data sending resources are used by the terminal to select a transmission resource for sending uplink data to the first base station, and the candidate downlink data receiving resources are used by the terminal to select a transmission resource for receiving downlink data from the first base station,
  wherein the candidate uplink data sending resources comprise one of the following: uplink data sending resources on which interference is likely to be generated, uplink data sending resources on which interference is generated or uplink data sending resources on which no interference is generated; and
  the candidate downlink data receiving resources comprise one of the following: downlink data receiving resources on which interference is likely to be generated, downlink data receiving resources on which interference is generated or downlink data receiving resources on which no interference is generated.

20. The method of claim 19, further comprising: receiving a resource request indication from the terminal, wherein the resource request indication is used to request allocation of the candidate uplink data sending resources or the candidate downlink data receiving resources.

* * * * *